United States Patent
Kothari et al.

(10) Patent No.: US 7,312,716 B2
(45) Date of Patent: Dec. 25, 2007

(54) WIRELESS COMMUNICATION USING AN INTRINSICALLY SAFE DESIGN FOR USE IN A HAZARDOUS AREA

(75) Inventors: Ajay Kothari, Lowell, MA (US); Parag Shah, Billerica, MA (US)

(73) Assignee: Azonix, Billerica, MA (US)

( * ) Notice: Subject to any disclaimer, the term of this patent is extended or adjusted under 35 U.S.C. 154(b) by 276 days.

(21) Appl. No.: 11/242,877

(22) Filed: Oct. 5, 2005

(65) Prior Publication Data
US 2006/0077612 A1 Apr. 13, 2006

Related U.S. Application Data

(60) Provisional application No. 60/522,475, filed on Oct. 5, 2004.

(51) Int. Cl.
*G08B 21/00* (2006.01)
(52) U.S. Cl. .......................... 340/635; 340/657; 361/1
(58) Field of Classification Search ............... 340/635, 340/638, 657, 636.12, 636.18; 361/1, 104, 361/247
See application file for complete search history.

(56) References Cited

U.S. PATENT DOCUMENTS

| | | | | |
|---|---|---|---|---|
| 4,412,265 | A | 10/1983 | Buuck | 361/18 |
| 4,638,396 | A * | 1/1987 | Mukli et al. | 361/101 |
| 4,691,384 | A | 9/1987 | Jobe et al. | 455/602 |
| 4,709,240 | A | 11/1987 | Bordenave | 343/772 |
| 5,014,156 | A | 5/1991 | Bruch et al. | 361/58 |
| 5,992,436 | A | 11/1999 | Hellman et al. | 137/1 |
| 6,034,611 | A * | 3/2000 | Brooks et al. | 340/647 |
| 6,111,738 | A | 8/2000 | McGoogan | 361/91.5 |
| 6,127,936 | A | 10/2000 | Gendel et al. | 340/692 |
| 6,154,683 | A | 11/2000 | Kessler et al. | 700/150 |
| 6,229,448 | B1 | 5/2001 | Bennett, Jr. et al. | 340/618 |
| 6,369,715 | B2 | 4/2002 | Bennett, Jr. et al. | 340/618 |
| 6,397,322 | B1 | 5/2002 | Voss | 712/35 |

(Continued)

FOREIGN PATENT DOCUMENTS

DE 4130704 A1 5/1993 ................. 526/217

OTHER PUBLICATIONS

Havens, Phillip: "LAN/WAN Ethernet Overcurrent And Overvoltage Protection" Electronic Design, Penton Media, Cleveland, OH, US; vol. 48, No. 9; May 1, 2000; pp. 126, 128.

*Primary Examiner*—Phung T. Nguyen
(74) *Attorney, Agent, or Firm*—IP Authority, LLC; Ramraj Soundararajan

(57) ABSTRACT

A wireless circuit setup is used in a hazardous area where the circuit is intrinsically safe and does not require explosion proof containment. In this setup, an intrinsically safe master barrier (420) is used without the use of a resistor and one or more resistors (R1, R2, R3) are placed in at least one final barrier at the output end prior to the signal exiting the system. The use of resistors (R1, R2, R3) at the final barrier reduces the loss of power and speed. Optionally, in this setup, the antenna can be located remotely from the remaining components of the wireless transceiver. The antenna can also be connected the optional device using the same cable that shows the communication status information, such as transmit/receive status, signal strength, power, etc, in hazardous area.

17 Claims, 5 Drawing Sheets

U.S. PATENT DOCUMENTS

| | | |
|---|---|---|
| 6,404,609 B1 | 6/2002 | Mansfield et al. ........... 361/103 |
| 6,490,439 B1 | 12/2002 | Croft et al. .................... 455/90 |
| 6,583,982 B2 | 6/2003 | Mancini et al. ............. 361/683 |
| 6,654,593 B1 | 11/2003 | Simmons et al. ........ 455/234.1 |
| 6,670,917 B1 | 12/2003 | Maniscalco et al. ... 342/357.17 |
| 6,751,076 B2 | 6/2004 | Lytollis ....................... 361/56 |
| 2001/0028305 A1 | 10/2001 | Bennett, Jr. et al. ........ 340/540 |
| 2002/0002426 A1* | 1/2002 | Burkhard .................... 700/286 |
| 2002/0065631 A1 | 5/2002 | Loechner .................... 702/188 |
| 2002/0070869 A1 | 6/2002 | Dungan ....................... 340/632 |
| 2002/0155822 A1 | 10/2002 | Adachi ........................ 455/293 |
| 2002/0177401 A1 | 11/2002 | Judd et al. .................. 455/11.1 |
| 2002/0191372 A1 | 12/2002 | Mancini et al. ............. 361/683 |
| 2003/0025612 A1 | 2/2003 | Holmes et al. ........ 340/870.02 |
| 2003/0058098 A1 | 3/2003 | Sebanc et al. ............... 340/539 |
| 2003/0058964 A1 | 3/2003 | Esquerra-Moreu et al. . 375/319 |
| 2003/0083038 A1* | 5/2003 | Poon et al. .................. 455/344 |
| 2003/0109937 A1 | 6/2003 | Zielinski et al. ................ 700/1 |
| 2003/0181188 A1 | 9/2003 | Darabi ........................ 455/313 |
| 2003/0234693 A1 | 12/2003 | Staszewski et al. ........... 331/16 |
| 2004/0002311 A1 | 1/2004 | Feng ....................... 455/194.2 |
| 2004/0017841 A1 | 1/2004 | Siwiak ........................ 375/146 |
| 2004/0027792 A1* | 2/2004 | Newman ..................... 361/679 |
| 2004/0056771 A1 | 3/2004 | Dungan ....................... 340/632 |
| 2004/0066588 A1 | 4/2004 | Flasza et al. ................... 361/9 |
| 2004/0075566 A1 | 4/2004 | Stepanik et al. ............. 340/632 |
| 2004/0081256 A1 | 4/2004 | Shi et al. ..................... 375/317 |
| 2004/0158334 A1 | 8/2004 | Kirkpatrick et al. ........... 700/27 |

* cited by examiner

WIRELESS COMMUNICATION USING AN INTRINSICALLY SAFE DESIGN FOR USE IN A HAZARDOUS AREA

RELATED APPLICATIONS

The present application claims the benefit of provisional application "Wireless Communication Using an Intrinsically Safe Design for Use in a Hazardous Area" Ser. No. 60/522,475 filed Oct. 5, 2004.

BACKGROUND OF THE INVENTION

1. Field of Invention

The present invention relates generally to the field of communications. More specifically, the present invention is related to intrinsically safe communications in a hazardous area.

2. Discussion of Prior Art

In the industrial automation market in recent years, Ethernet has become a standard choice for digital communication between various hardware devices. For Ethernet communications in Hazardous areas, customers use either a combination of specialized copper cable and connector or a fiber cable. There are very significant difficulties in using cables in hazardous areas. For electrical signals that are not intrinsically safe (I.S.) in hazardous area, the wiring regulations are very stringent and requires very specialized cables often requiring armor (for physical protection against cable cuts) and specialized methods of cable entry and termination. In the case of connectors for easy connection mechanism, the connectors must meet explosion-proof (or flame-proof) requirements. These specialized connectors are not offered for a wide range of applications and are expensive. In addition to these difficulties, the cables require maintenance as these are prone to damage. This increases the operational cost both in periodic maintenance and replacement of damaged cables.

In applications where it is not desirable or feasible to use the cable (because of distance, installation limitation etc.) wireless communication is being considered. Industry standard Ethernet-based wireless communication has become commercially acceptable and is gaining acceptance in industrial applications as well. However, there are a very limited number of solutions available for use in hazardous areas. Such prior art solutions involve the use of an explosion-proof box where the radio transceiver is mounted and the antenna is "attached" to the explosion-proof box. The signal strength indicators of the prior art are not designed for hazardous areas.

The following references provide general teachings for communicating in a hazardous area.

The patent to Hellman et al. (U.S. Pat. No. 5,992,436) assigned to Armstrong International, Inc. provides for a monitoring steam traps using RF signaling. Disclosed is transmitter 58 to provide a spread spectrum wireless communication link. Monitor and associated equipment are intrinsically safe and will not produce a spark or a heated surface sufficient to ignite or cause explosion of various hazardous material (see column 6 lines 35-40, 61-67).

The patent to Mansfield et al. (U.S. Pat. No. 6,404,609 B1) assigned to Micro Motion, Inc. provides for a circuit that reduces the numbers of components needed to transmit data from intrinsically safe to non-intrinsically safe circuits using opto-couplers. Disclosed is an intrinsically safe circuit 201 configured for supplying intrinsically safe power from a power supply in a hazardous environment (see abstract).

The patent to Lytollis (U.S. Pat. No. 6,751,076 B2) assigned to The MTL Instruments Group plc, provides for protection of intrinsically safe circuits. Disclosed is voltage sensor A1 and current sensor A2 and intrinsically safe circuits that operate within hazardous areas (see column 1 lines 8-9 and column 2 lines 59-61)

The patent application publication to Loechner (2002/0065631 A1) provides for a field device configured for wireless data communication. Discussed is the passive achievement of intrinsic safety through related design of electronics to avoid overheating and increased current/voltage (see paragraph 15). Discussed field device may communicate with the remote device 48 having a transmitter and/or receiver 52 for wireless data communication (see paragraph 65).

The patent application publication to Zielinski et al. (2003/0109937 A1) provides an intrinsically safe field maintenance tool. Disclosed is tool 22 that is able to transfer information using infrared data access port (see paragraph 22). Module 44 is replaceable in hazardous areas in a process plant and complies with intrinsic safety requirements by using energy limiting circuits to prevent sources of ignition (see paragraph 24).

The patent application publication to Kirkpatrick et al. (2004/0158334 A1) assigned to Rosemount Inc. provides for a two-wire field-mounted process device. Disclosed is a loop communicator 36 which can include suitable isolation circuitry to facilitate compliance with the intrinsic safety specification (see paragraph 23).

The patent application publication to Dungan (2002/0070869 A1), assigned to Gastronics', Inc., provides for a monitoring method. Disclosed is a monitor system 20 having a master station 22 and a plurality of monitor stations 24. The monitor station 24 has a radio 36 with antenna 70. The monitor stations 24 have explosion-proof housings 44. The gas sensor 66 (inside of stations 24) is of the intrinsically safe type (see FIGS. 1-3; and paragraphs 27, 29, 32, 35, 37, 50, and 58).

The patent application publication to Poon et al. (2003/0083038 A1) provides for a signal adapter. Disclosed is a signal adapter 103 having a radio transceiver located within an explosion proof container 107. The signal adapter outputs an intrinsically safe signal to an antenna 101. The output signal must not be capable of igniting an explosive material (natural gas) (see FIGS. 1-2; and paragraphs 4, 5, 15-17, 20-21, 31, and 33).

The patent application publication to Flasza et al. (2004/0066588 A1), assigned to Magnetrol International, provides for a process control instrument intrinsic safety barrier. Disclosed is an antenna 26 using a coaxial cable 28 having connectors 30 and 32. The first connector 30 is connected to the antenna 26. The second connector 32 is connected to a connector 34 located in a housing 22. An intrinsic safety (IS) barrier or circuit 78 is proximate the antenna connection 34 to guarantee that sufficient amounts of energy cannot be transferred into a tank (via the antenna) causing an explosion (see FIGS. 1, 3; and paragraphs 4, 8, 16, 31, 33, 35, 36, 39, 42, 44, and 48).

Whatever the precise merits, features, and advantages of the above cited references, none of them achieves or fulfills the purposes of the present invention.

SUMMARY OF THE INVENTION

The present invention provides for an intrinsically safe radio transceiver without the use of an explosion-proof box with I.S. interface for wired connection (such as Ethernet, serial, fiber, etc.) and I.S. antenna output (RF). The radio transceiver works on industry standard IEEE 802.11 a/b/g, but, the teachings of the present invention can be extended to any radio transceiver, such as those working on @900 MHz or blue-tooth or zigbee etc. The system and method of the present invention allows the use of standard cable, connectors and antenna for ease of installation and lower cost of system, maintenance and installation.

The present invention also provides for a setup wherein the communication signal's strength can be shown at the antenna end in a Hazardous area using an external device where the antenna is attached. This is achieved by modulating "variable DC-offset" on the same RF cable and the device is "optional".

DESCRIPTION OF THE PREFERRED EMBODIMENTS

Figure 1:
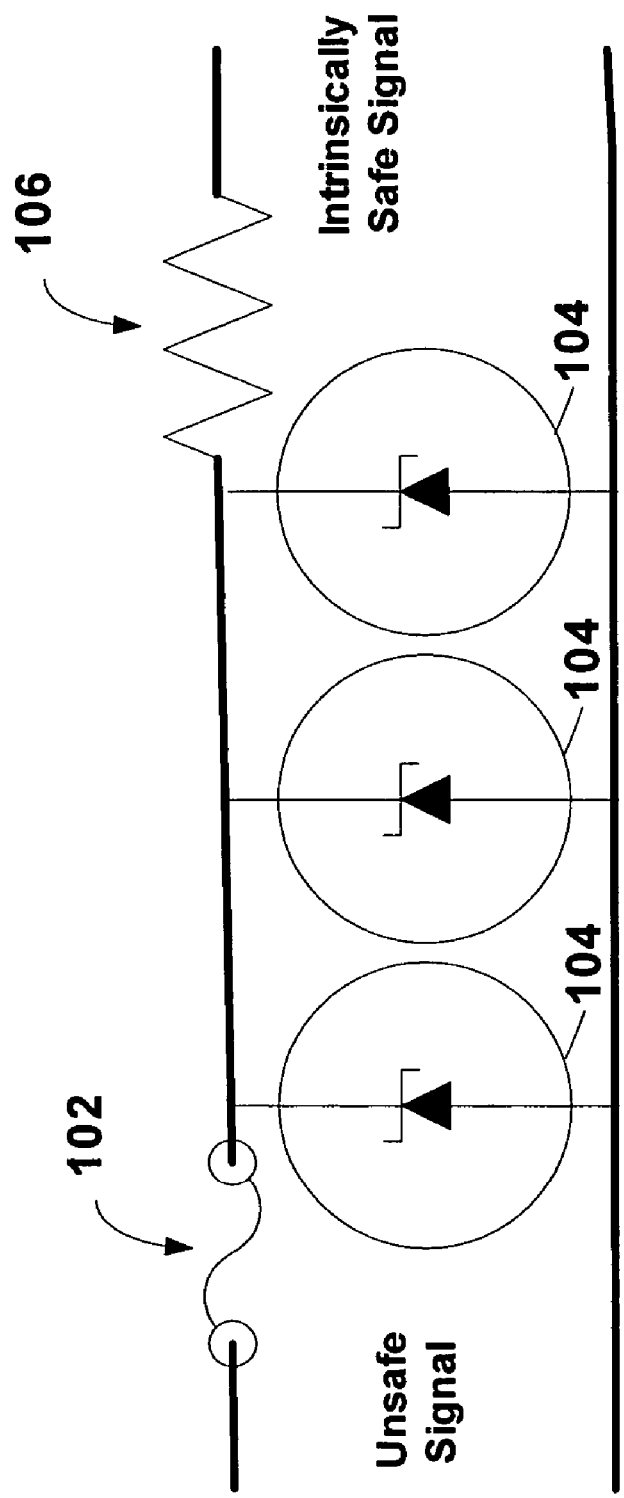
FIG. 1 illustrates a typical barrier design.

While this invention is illustrated and described in a preferred embodiment, the invention may be produced in many different configurations. This is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention's device is designed for wireless communication in a hazardous area using the concept of Intrinsic Safety (I.S.). As mentioned earlier, there are various methods used for protecting electronics and electrical devices in a hazardous area, such as: placing the device in an explosion proof enclosure, placing the device in a positively pressurized enclosure, producing an electrical design that limits the energy severely wherein, even with the faults considered, the energy is not sufficient to cause an explosion (intrinsically safe designs). The concept of intrinsic safety limits the power used in the device as well as the special care required for the electrical signals that are exiting the module and entering the hazardous area. Though intrinsically safe designs are restrictive, there are numerous advantages in the field including installation flexibility and maintenance cost.

The benefits of intrinsically safe wireless communication in a hazardous area include, but are not limited to:

1. the ability to connect and disconnect antenna and cables while units are powered in a hazardous area (this is very helpful in resolving the problem quickly), 2. the flexibility of detaching the antenna from the enclosure, wherein antennas can be installed for optimum performance, 3. the ability to use standard antennas and cables (as opposed to using special ones), and since the electrical interface is intrinsically safe, the user can select any available standard off-the-shelf antenna with various gains best suited for application and meets the regulation for radiated power (e.g., FCC regulations in USA and CE regulations in Europe), and 4. the present invention's intrinsically safe method is independent of communication frequency and data throughput (e.g., this method is applicable across 900 MHz, IEEE 802.11 a/b (2.4 GHz), IEEE 802.11 g (5.4 GHz), etc).

In the preferred embodiment, the disclosed design is implemented for wireless communication based on the IEEE 802.11b protocol. The design of the preferred embodiment comprises an embedded controller, a radio transceiver, a barrier and an interface PCB with power supply, an interconnection between radio and controller, and other peripheral interfaces such as copper (CAT5/5e/6) Ethernet, serial, fiber Ethernet, etc.

A brief description of the basic components of an intrinsically safe barrier and its purpose is now described. FIG. 1 illustrates a barrier design. The intrinsically safe barrier of FIG. 1 comprises a fuse 102, Zener diodes (redundant) 104, and a resistor 106. Fuse 102 defines the power rating of the Zener diodes 104. Zener diodes 104 define the operating voltage of the intrinsically safe module and the allowed capacitance. The resistor defines the maximum power in the module and the short circuit current (therefore the allowed output inductance). In addition to these components, a few other components allowed as intrinsically safe components are transformer and high quality capacitors (it should be noted that electrolytic caps are not considered high quality). The above described components, when used appropriately as per the guidelines in the intrinsically safe standards, are considered as infallible components used for the design of intrinsically safe barrier.

Resistor 106 at the output is required to limit the short circuit current as per I.S. standards. But, the use of resistor 106 along with fuse 102 and the voltage clamping device (i.e., Zener Diodes 104) has a negative impact on the design such as loss of power (the maximum power allowed is $V^2/4R$), loss of speed (as resistor acts as a low pass filter component), etc.

Figure 2:
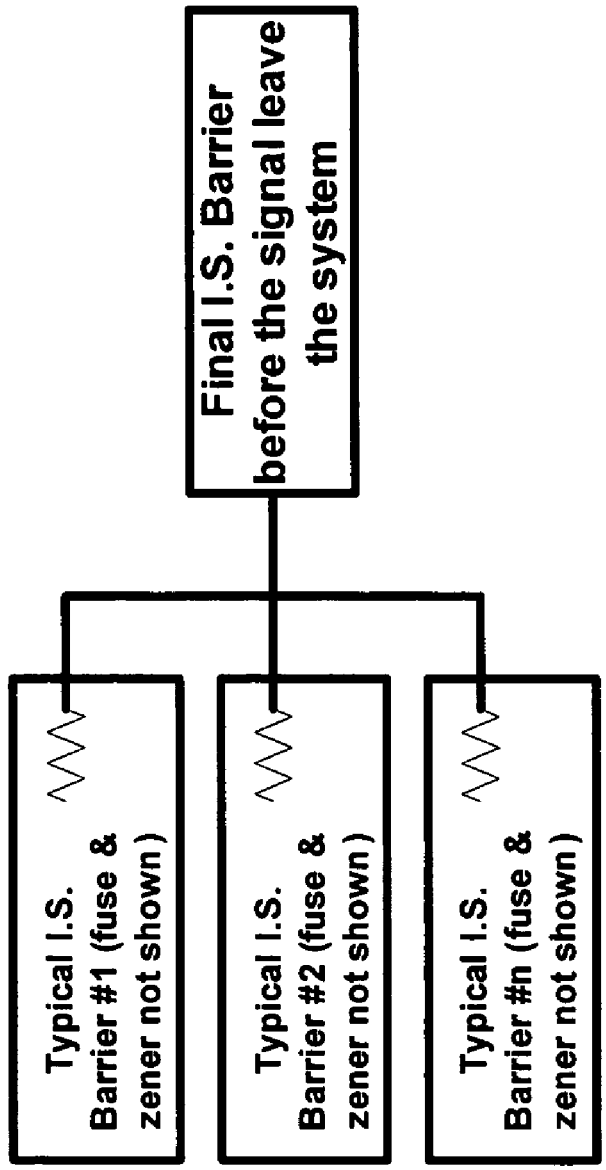
FIG. 2 illustrates a typical modular barrier design that offers flexibility for power.

FIG. 2 illustrates a technique used in the integration of various I.S. Modules. When more than one module requires interaction (such as serial, Ethernet etc. interfacing with controller in the present example), the I.S. circuit becomes more complicated. As described earlier, having a resistor (one per line, for example, if serial is 3 line than 3 individual resistor per line is required) limits the power transfer hence reduces the speed. This complicates the design as the typical electrical circuits, especially digital, is not designed to operate with series resistors.

In intrinsically safe designs, the focus is on the signals that are present in a hazardous area. This is the case in the wireless design as well. Because of this reason, rather than designing a full barrier (as described above) the barrier components are placed as individual components rather than a complete group in circuit for the best design and performance efficiency. FIG. 2 illustrates such a barrier design that offers flexibility for power. In the example of FIG. 2, by placing the resistor 202 at the output allows more power and still protects the signals in a hazardous area.

The concern with power dissipation in intrinsically safe designs involves the temperature rise on the components. If hazardous gases or dust comes in contact with the high temperature component, this could cause ignition. This concern is handled by encapsulating (potting or epoxy) the PCB such that no components could come in direct contact with the high temperature components and the hazardous area interface is still safe.

Figure 3:
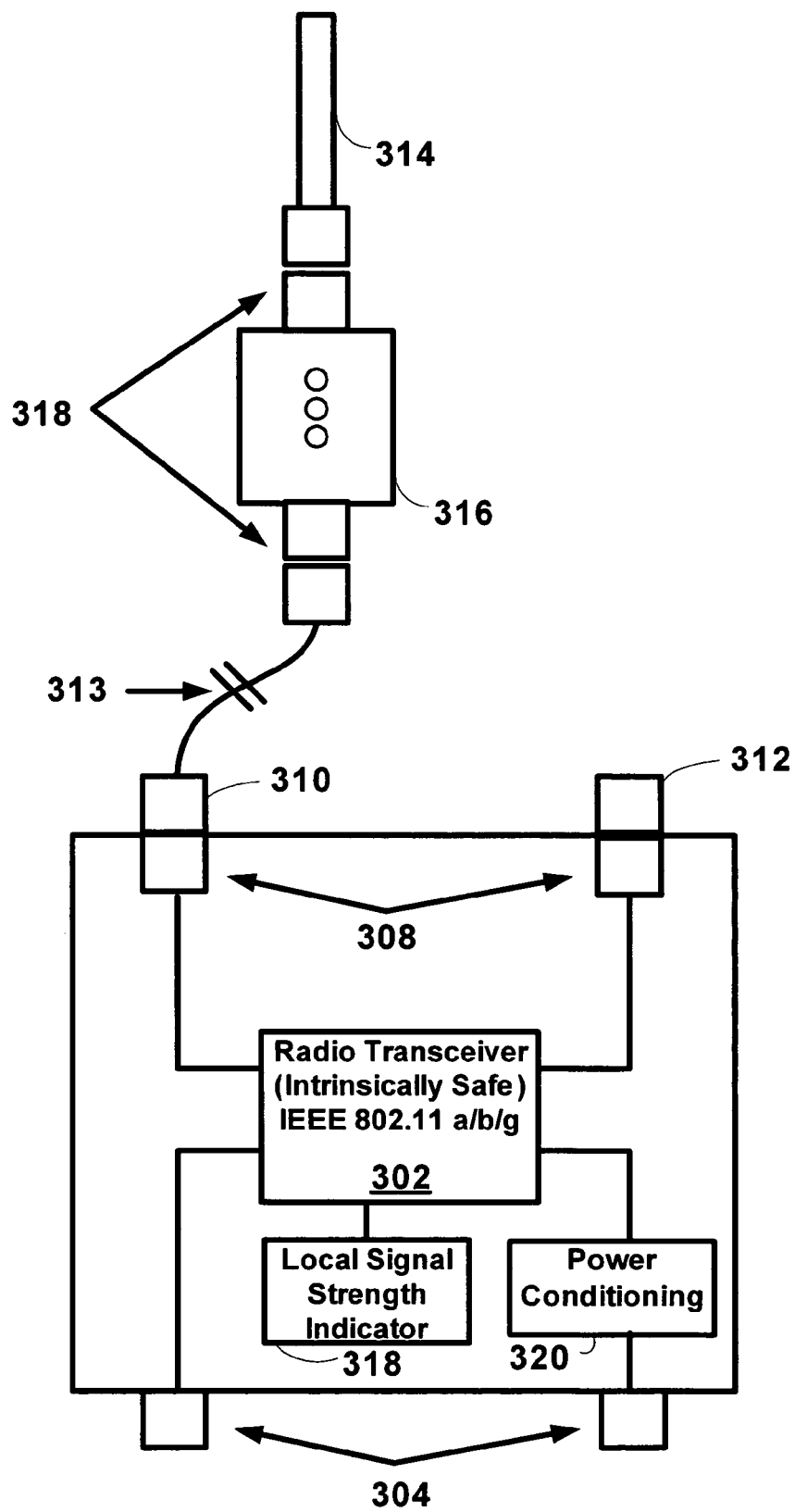
FIG. 3 illustrates a wireless access point design as per the teachings of the present invention.

As described earlier, the resistor in the output limits the short circuit current. However, for high speed signals, the resistor in the output creates a single pole low frequency filter that is not desired. Hence, an alternate technique is developed for such high speed data. FIG. 3 illustrates an intrinsically safe barrier for high speed signal using capacitors. In this technique, capacitors 302 are used instead of resistors in a blocking fashion (as capacitors do not pass DC). In the designs where the signals have DC state, the DC signal is converted to NRZ (non-return to zero) using standard encoding schemes such as (but not limited to) Manchester encoding. This technique is not necessary for AC signals.

FIG. 3 illustrates a sample setup of a wireless access point design as per the teachings of the present invention. An intrinsically safe radio transceiver 302 (capable of communicating via, for example, IEEE 802.11a/b/g protocols), in this setup, is placed in a sealed enclosure (e.g., NEMA4/IP66 or better). An I.S. wired interface for Ethernet (e.g., CAT 5 cable), serial, or fiber is accessible via one of the standard connectors or glands for wire entries 304. Another standard connector or gland for wire entry is used to input the power. It should be noted that for ATEX (CENELEC) zone 1 certification, the power I/P does not have to be I.S. as the standard allows potting EEx'm' where the power connection can be made using increased safety EEx'e' standard. For US/Canada (class 1 Division 1) or ATEX (CENELEC) Zone 0 certification, the power I/P should be intrinsically safe and fed from external power barrier.

Surge suppressor/lightning arrestors 308 are also used within this setup. Block 318 represents a local signal indicator unit for indicating the strength of the wireless signal. Block 320 represents a power conditioning unit. There are two different kinds of power conditioning units based on the certification requirements.

If the system is designed for ATEX Zone1 (or IEC Class 1, Zone1), the power conditioning unit may contain non-intrinsically safe power supply protected using EEx'm' and/or EEx'e' standards. This power supply may have either AC or DC input capability and desired low DC voltage output required to run radio transceiver along with other electrical circuits. The power supply also functions as an isolation circuits desired in an industrial applications.

If the system is designed for Zone 0 or Class I, Div 1 or IEC Class 1, Zone 0, the power to the radio transceiver is fed from external power barrier. The power barrier along with cable impedance causes voltage drop and this input voltage to the radio transceiver may not be suitable to proper functioning. In this case, the input power is conditioned (ex. Using DC/DC) to boost the voltage back to the desired level.

Blocks 310 and 312 represent main and auxiliary antenna interface (RF) using standard sealed RF connector (e.g., N-type). Cable 313 can be a standard RF cable (e.g., LMR400 or LMR 600). Antenna 314 can be a standard antenna (e.g., Omni-directional, Yagi, etc.) having standard sealed connectors (e.g., N-type). Signal strength indicators 316 (e.g., using LEDs) are mounted on the antenna.

Figure 4:
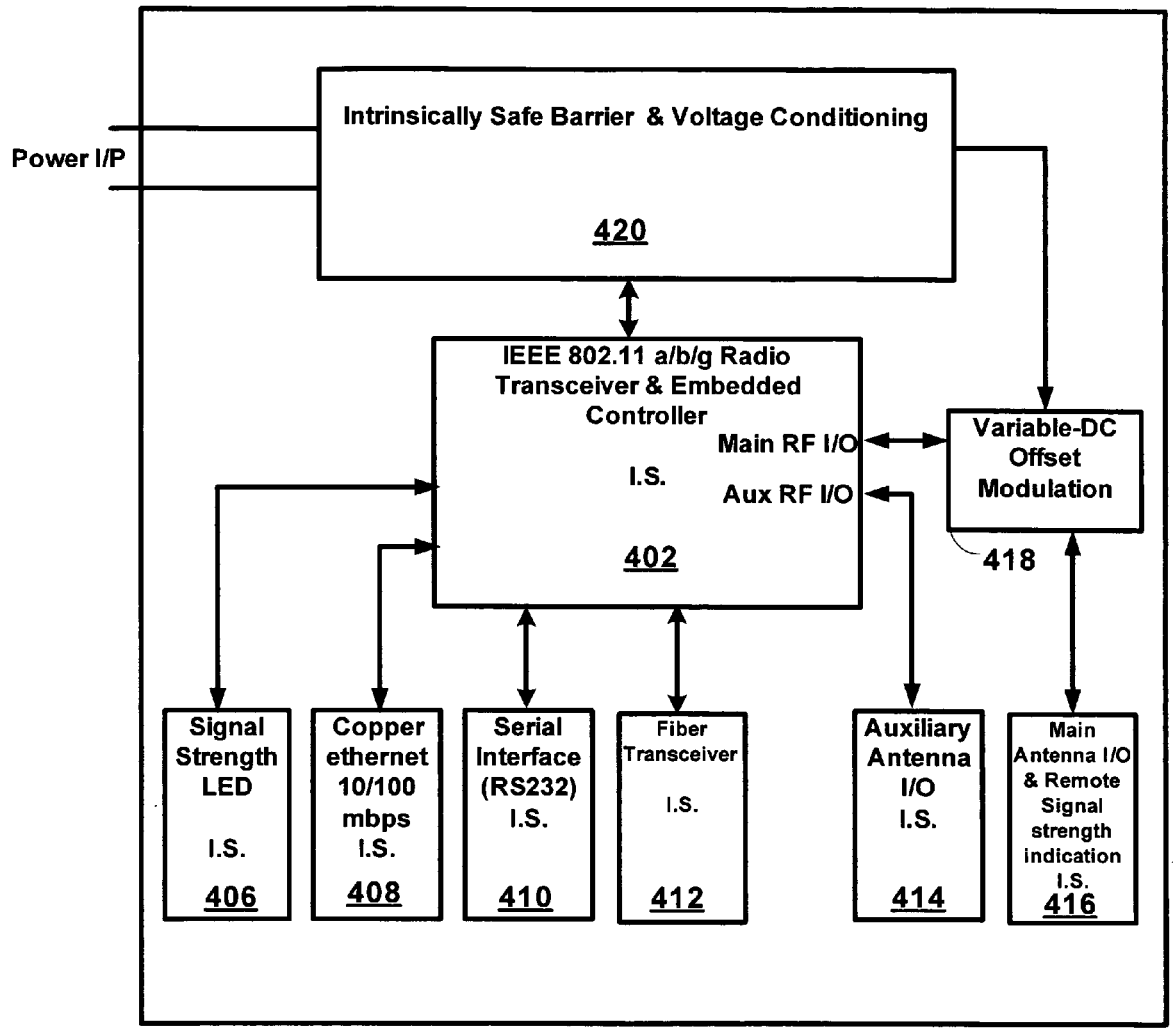
FIG. 4 illustrates a block diagram of an exemplary embodiment of the present invention's intrinsically safe Wireless Access Point design.

FIG. 4 illustrates a block diagram of an exemplary embodiment of the present invention's intrinsically safe Wireless Access Point design. In this design, the power input is unsafe and the interfaces to a hazardous area are made intrinsically safe either by a resistive or capacitive barrier.

Radio transceiver/embedded controller 402: The controller runs a TCP/IP stack and a wireless module configuration utility. This controller requires power higher than allowed by intrinsically safe standards and has more capacitance than allowed by intrinsically safe standards. Therefore, for simplicity of design, the input barrier is designed as a voltage barrier that only guarantees the worst case operating voltage and the resistor is eliminated. The major advantage of this method is that it allows the necessary power to the embedded controller required for proper operation. In addition, this controller can be any device. The transceiver is a device that meets a wireless standard, such as the IEEE 802.11b standard. This device, similar to embedded controller 402, is voltage barriered and can be replaced by any other similar device.

Signal Strength LED Interface 406: Interface 406 is made intrinsically safe using a resistive barrier.

Copper Ethernet 408: The 10/100 mbps Ethernet signal is NRZ (i.e., AC) hence the blocking caps is the choice for creating an intrinsically safe interface.

Serial Interface 410: Interface 410 is an optional interface and is low speed. Therefore, it is made intrinsically safe using a resistive barrier.

Fiber Interface 412: The power to fiber transceiver is made intrinsically safe using a resistive barrier as the diodes in a fiber transmitter could come in contact with hazardous gases through a fiber (hollow pipe). If the device is not made intrinsically safe, the power in fault condition could raise the surface temperature on the diodes creating an explosion. The interface to this device from the controller is made through a capacitive barrier therefore there is no additional power sharing from the controller.

Antenna output can be made intrinsically safe through a capacitive barrier. This signal is inherently AC therefore similar to copper Ethernet; capacitive barrier is a natural choice.

Auxiliary Antenna 414: Auxiliary antenna is used as a backup antenna to the main antenna. For the high bandwidth-long distance wireless communication it is desired to transmit the signals using high power. However, in the applications where high transmission power is not allowed (due to government regulation etc.), the auxiliary antenna can be a high gain antenna used "only" as receiving antenna. Since this high-gain receiver antenna does not add to the transmission power, the "effective" high power communication is achieved using low-transmission power matched with high-reception gain.

Variable-DC Offset Modulation 418: This technique is used to transmit the discrete information such as various levels of signal strength indication. The fixed DC (say level X) is the base voltage required for the electrical circuits to function at the signal strength indicator (316). To show various information such as signal strength, transmit/receive etc. the DC levels are grouped and added. For ex, the level X+S is grouped to indicate the signal strength level and the level X+T is grouped to indicate the transmit/receive status. There are various level within signal strength indication and these are X+S+(s1, s2, s3 etc.). This variable DC level transmitted to the signal strength indicator (316) is decoded and appropriate LEDs are shown based on the information received from the variable-DC offset module 418.

Intrinsically Safe Barrier and Voltage Conditioning 420: There are two different ways the power is supplied to 420. 1> For ATEX Zone1 (or IEC Class 1, Zone1), the power supplied may be non I.S. low DC voltage (ex. 5 VDC)

supplied by an upstream power conditioning unit 320. The voltages are clamped using standard I.S. barrier techniques such as zener diodes and fuse (but without the current limiting resistors) 2> For Zone 0 or Class I, Div 1 or IEC Class 1, Zone 0, the power to the radio transceiver is fed from external power barrier. The power barrier along with cable impedance causes voltage drop and this input voltage to the radio transceiver may not be suitable to proper functioning. In this case, the input power is conditioned (ex. Using DC/DC) to boost the voltage back to the desired level.

Remote signal strength indication on the antenna 416: This is a low frequency modulation on the main carrier frequency (similar to DC offset). The signal strength status is modulated and sent to the antenna where the information is decoded and displayed using LEDs on the antenna. Intrinsic safety is achieved using a resistive barrier.

Figure 5:
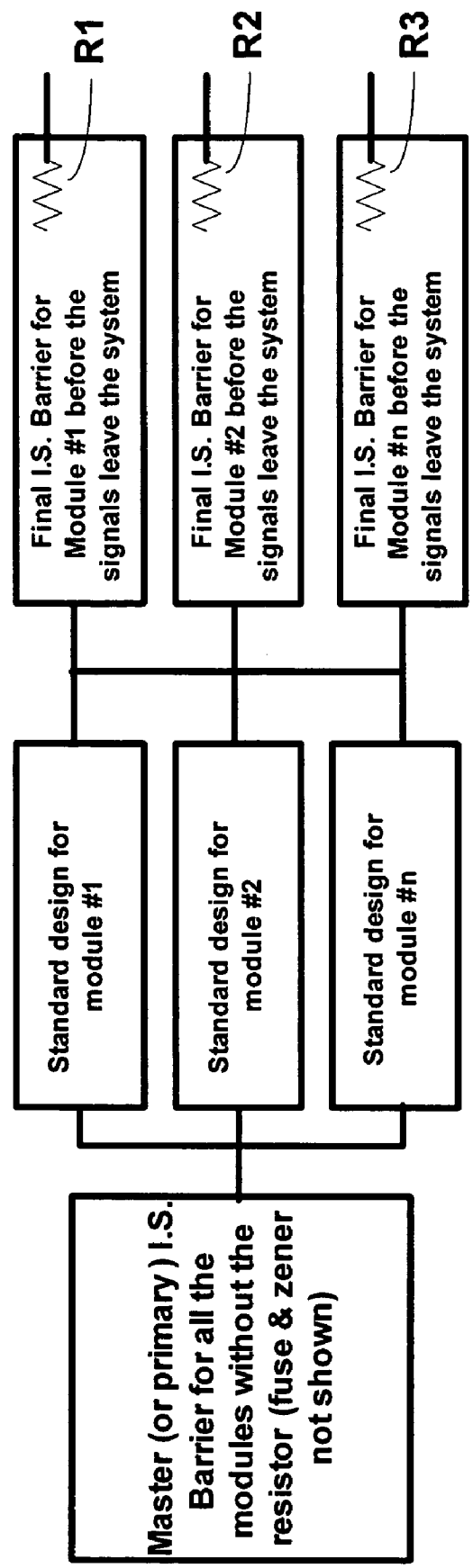
FIG. 5 illustrates a block diagram showing the master (or primary) barrier and the final (or secondary) barrier(s) of the present invention.

FIG. 5 illustrates an exemplary embodiment of the present invention. In highly integrated circuits, it is desired to limit the I.S. voltage using Zener diode in the front without the current limiting resistor. This allows the complete circuit evaluation at the specified Zener voltage per I.S. standards. There are several benefits such as ability to use standard design practice for each module, the standard design practice for interfaces between each module and ability to place the components in close proximity, lower PCB trace separation etc.

As Master I.S. barrier (primary I.S. barrier) indicates the block 420 from FIG. 4. Various modules within FIG. 4 are integrated without the use of current limiting resistors. These modules are evaluated as "voltage clamped" circuits (102 & 104 in FIG. 1) and not as I.S. because it does not have the final current limiting resistor (106 in FIG. 1). These modules are 402, 418, 406, 408, 410, 412, 414 and 416. Up to these points, the signals are within the module and not exiting in the hazardous area. These modules interact with each other and are designed using standard electrical design practice. The final (or secondary) barriers (current limiting resistors item 106 in FIG. 1) are placed on the modules (406, 408, 410, 414 and 416) before the signal exit the unit and enter the hazardous area.

According to the present invention, resistors R1, R2, and R3 are placed at the output before the signal "leaves" the system. One major benefit is that the normal (non I.S.) designs can be implemented as there is no loss of power or speed. In the above described block diagram, various modules are interfaced using this method.

In one embodiment, the power is supplied by an external power barrier. The radio, when operated as access point, requires the wired interface such as Ethernet, serial etc. Instead of powering the module with separate power barrier, in another embodiment, the power can be transmitted on the "wired" interface such as Power over Ethernet (PoE)

If the application requires placing only the antenna in a hazardous area as compared to complete access point, it is a desired option to create only "RF" barrier such that entire system is installed in a safe area with an antenna installed in a hazardous area.

It should be noted that although the current design uses IEEE 802.11 a/b/g, the same concept can be used for any standard wireless transmission in hazardous area.

CONCLUSION

A system and method has been shown in the above embodiments for the effective implementation of a wireless communication using an intrinsically safe design for use in a hazardous area. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by specific hardware, etc.

The invention claimed is:

1. A communication setup comprising:
    a. an intrinsically safe primary barrier implemented without a resistor, said intrinsically safe primary barrier comprising a fuse and one or more Zener diodes, said intrinsically safe primary barrier receiving an input power signal in a hazardous area and providing an intrinsically safe power signal as an output;
    b. at least one standard module working in conjunction with said intrinsically safe primary barrier to receive and process data signals;
    b. at least one intrinsically safe secondary barrier working in conjunction with said at least one standard module to output said processed data signal, said intrinsically safe secondary barrier comprising a fuse, one or more Zener diodes, and at least one resistor,
    wherein implementing said resistor where a signal exits at said intrinsically safe secondary barrier in said communication setup reduces loss of power and loss of signal.

2. A communication setup as per claim 1, wherein said received data signals are wireless data signals and said at least one standard module is an Ethernet interface.

3. A communication setup, as per claim 2, wherein, in a power-over-Ethernet (PoE) implementation, power is transmitted along with wireless data over said Ethernet interface.

4. A communication setup, as per claim 2, wherein wireless data signals are received over at least one antenna, said at least one antenna further comprising a signal strength indicator indicating strength of said received wireless signal.

5. A communication setup, as per claim 4, wherein said signal strength indicator in said at least one antenna is implemented via one or more LEDs.

6. A communication setup, as per claim 1, wherein said at least one antenna is remotely located at a hazardous zone away from said communication setup which is located in a safe area.

7. A wireless communication setup comprising:
    a. an antenna receiving wireless signals;
    b. an intrinsically safe primary barrier implemented without a resistor, said intrinsically safe primary barrier comprising a fuse and one or more Zener diodes, said intrinsically safe primary barrier receiving an input power signal in a hazardous area and providing an intrinsically safe power signal as an output;
    c. an intrinsically safe radio transceiver and embedded controller working in conjunction with said intrinsically safe primary barrier converting received wireless signals for transmission via at least one standard module; and
    d. at least one intrinsically safe secondary barrier working in conjunction with said intrinsically safe radio transceiver and embedded controller and said at least one standard module to output said converted wireless signal, said intrinsically safe secondary barrier comprising a fuse, one or more Zener diodes, and at least one resistor,
    wherein placing said at least one resistor where a signal exits at said intrinsically safe secondary barrier in said wireless communication setup reduces the loss of power and loss of signal.

8. A wireless communication setup, as per claim 7, wherein said standard module implements any of the following: an Ethernet interface, a serial interface, or a fiber interface.

9. A wireless communication setup, as per claim 8, wherein, in a power-over-Ethernet (PoE) implementation, power is transmitted along with received wireless data over said Ethernet interface.

10. A wireless communication setup, as per claim 7, wherein said antenna further comprises a signal strength indicator indicating strength of said received wireless signal.

11. A wireless communication setup, as per claim 10, wherein said signal strength indicator is implemented via one or more LEDs.

12. A wireless communication setup, as per claim 7, wherein said antenna is remotely located from said intrinsically safe primary barrier, said intrinsically safe radio transceiver and embedded controller, and said at least one intrinsically safe secondary barrier.

13. A wireless access point comprising:
 a. an antenna receiving wireless signals;
 b. an intrinsically safe primary barrier implemented without a resistor, said intrinsically safe primary barrier comprising a fuse and one or more Zener diodes, said intrinsically safe primary barrier receiving an input power signal in a hazardous area and providing an intrinsically safe power signal as an output;
 c. an intrinsically safe radio transceiver and embedded controller converting wireless signals for transmission via at least a standard Ethernet interface; and
 d. at least one intrinsically safe secondary barrier working in conjunction with said radio transceiver and embedded controller and said Ethernet interface to output said converted wireless signal over a wired Ethernet connection, said intrinsically safe secondary barrier comprising a fuse, one or more Zener diodes, and at least one resistor,
 wherein placing said at least one resistor where a signal exits via said wired Ethernet connection reduces the loss of power and loss of signal.

14. A wireless access point, as per claim 13, wherein, in a power-over-Ethernet (PoE) implementation, power is transmitted along with received wireless data over said Ethernet interface.

15. A wireless access point, as per claim 13, wherein said antenna further comprises a signal strength indicator indicating strength of said received wireless signal.

16. A wireless access point, as per claim 15, wherein said signal strength indicator is implemented via one or more LEDs.

17. A wireless access point, as per claim 13, wherein said antenna is remotely located from said intrinsically safe primary barrier, said intrinsically safe radio transceiver and embedded controller, and said at least one intrinsically safe secondary barrier.

* * * * *